March 3, 1931.    C. B. WATERS    1,795,101
AUTOMOBILE HEATING APPARATUS
Filed Jan. 24, 1927

Inventor
Charles B. Waters
By William A. Strauch
Attorney

Patented Mar. 3, 1931

1,795,101

UNITED STATES PATENT OFFICE

CHARLES B. WATERS, OF MONTCLAIR, NEW JERSEY, ASSIGNOR TO TROPIC-AIRE INCORPORATED, OF MINNEAPOLIS, MINNESOTA, A CORPORATION OF DELAWARE

AUTOMOBILE HEATING APPARATUS

Application filed January 24, 1927. Serial No. 163,092.

The present invention relates to improved apparatus for heating motor driven vehicles, and more particularly the invention relates to methods and apparatus for heating automobiles provided with passenger carrying body compartments and driven by internal combustion engines with cooling systems for the engines.

Various types of automobile heating systems have heretofore been proposed. In the most practical types hot water from the engine cooling system has been diverted through a hot water heater located in the automobile body. These systems require special diverter connections in the cooling system and specially designed heaters, and are relatively expensive in initial cost. They can be applied only to automobiles with forced circulation in the cooling system, are relatively slow in initially raising the temperature of the car, and to get satisfactory temperatures in the average type of automobile it is necessary to utilize radiator covers or thermostatic control devices to maintain the temperature of water in the cooling system at a relatively high point, in some instances as high as 160° Fahrenheit, when external temperatures are low. As a result in cold weather, a tendency exists to boil alcohol and non-freezing volatile mixtures out of the cooling system at a rapid rate. These systems are odorless in operation, do not develop excessive temperatures, and are free from danger of introduction of carbon monoxide into the vehicle. As the temperature rises in the vehicle body a tendency for moisture to condense on the inner surface of the windshield exists.

In the prior proposed hot air heating systems for automobiles it has been the practice to utilize exhaust gas connections from the engines or exhaust gases themselves to heat the air supplied to the car. Systems of this type are dangerous due to the possibility of exhaust gas leaks into the body of the car. Unpleasant odors and excessive temperatures also frequently develop in this type of heating system and the results secured are more or less unsatisfactory from the heating viewpoint.

I have discovered that it is possible to eliminate the disadvantages of prior hot water and air heating systems for automobiles by repeatedly circulating the air in the compartment to be heated over a comparatively low temperature heating surface, preferably heated by water in the engine cooling system. This is the basic concept of my invention and by applying it in practice I have developed various forms of heating systems for automobiles by means of which the temperature in the usual passenger carrying compartments of automobiles can be raised to and maintained at a comfortable degree. Sufficient external air may be admitted for ventilation purposes without interfering with the rapid heating action of my improved systems. By circulating the air in the car body repeatedly and rapidly and over a surface heated by water from the circulation system, a rapid heating action can be secured although the water temperatures may be as low as 100 degrees Fahrenheit, while for the usual types of water heating systems, temperatures of 160 degrees Fahrenheit or higher are required for reasonably satisfactory operation. Because of the relatively low temperatures of operation necessary for satisfactory operation of my improved heating systems, thermostatic controls and radiator protection may be eliminated, and the temperature of the water in the cooling system may be maintained sufficiently low to prevent substantial boiling out of alcohol and like volatile non-freezing mixtures during cold weather. Furthermore, the atmosphere in the car body is maintained relatively dry so that as the temperature rises there is no tendency for the windshield to cloud due to the absence of condensation of moisture in my improved apparatus.

Accordingly, a primary object of my invention is to provide novel heating systems for motor vehicles in which the advantages of prior water and air heating systems are retained without the attendant disadvantages.

A further object of the invention is to provide novel simplified apparatus for heating motor cars by utilizing the water in the cooling systems for the engines without necessitating the use of excessive temperatures in the cooling systems.

A further object of the invention is to provide novel and efficient heating system for use in any of the types of commonly used automobiles that are equally applicable to automobiles with thermo-siphon or circulating pump cooling systems for the engine.

Further objects of the invention will appear in the following detailed description of the preferred embodiments thereof and are such as may be attained by a utilization of the various combinations, sub-combinations, steps, and principles hereinafter set forth, and as more fully defined by the scope of the appended claims.

Figure 1:
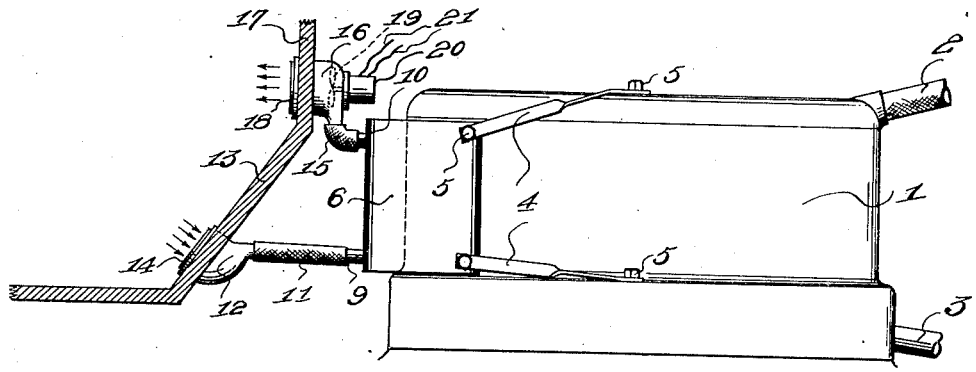
Figure 1 is a more or less diagrammatic side elevation, showing a preferred arrangement of the invention.
Figure 2:
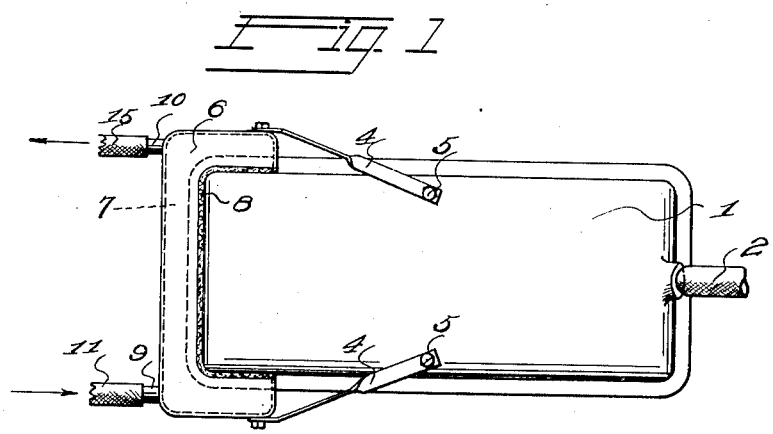
Figure 2 is a fragmental plan view showing the arrangement of air ducts of the form of invention shown in Fig. 1.

As shown in Figures 1 and 2, the reference numeral 1 indicates the engine of an automobile of any usual type, provided with the ordinary water cooling jacket which is connected by the conduits 2 and 3 to the usual cooling radiator.

Secured to the engine 1 by means of securing straps 4 and bolts or cap screws 5 is a metallic casing member 6, preferably lined with heat insulating material and fitting around the end of the engine in a manner forming an air heating space 7, the inner wall of which is the outer wall of the engine cooling jacket. To prevent leakage of air around the edges of the casing 6, a suitable felt gasket 8 is preferably interposed between the inner edges of the casing and the engine jacket. Formed integrally with the casing 6 is a lower air inlet connection 9 and an upper outlet connection 10. Air inlet connection 9 is connected by a flexible air conduit or tubing 11 to an air chamber member 12 supported in the inclined floor board 13 of the passenger carrying compartment or body of the car. On the interior of the car body the connection 12 is preferably provided with a shut-off disk 14 arrangement of any well known construction by means of which passage of air from the car body through the chamber 12 to conduit 11 and air heating chamber 7 may be controlled as desired or completely shut off.

Air outlet connection 10 of casing 6 is connected by means of the flexible conduit 15 to the air inlet chamber member 16 for the car body to be heated. The inner end of chamber member 16 extends through and is secured in the vertical section 17 of the car body. Chamber member 16 is provided with an adjustable shut off disk arrangement 18 by means of which the passage of air from chamber member 16 into the car body may be controlled at will by the operator.

Positioned in chamber 16 is a fan 19 which is driven in any suitable manner to draw air through the conduit 15 and to force it through chamber 16 into the car body. Preferably fan 19 is driven by an electrical motor 20 which receives its power from the storage battery or generating system of the vehicle through conductors 21, and is controlled by a switch conveniently located in the car body, preferably on the dash of a car, in a manner well known to those skilled in the art.

In operation of the system so far described, when the engine is running, the temperature of the water in the engine jacket will be raised in well known manner heating the walls of the water jacket. When it is desired to heat the car body, disks 14 and 18 are opened and fan 19 is driven drawing air through the open shut-off disk 14, air chamber 12, conduit 11, air heating chamber 7, and conduit 15, and forcing the air into the car body through chamber 16 and shut off disk 18. In its passage through chamber 7 the air contacts with the heated cylinder jacket and its temperature is raised before it is returned to the car. The temperature in the car will rise rapidly and a closed car body can be brought in a short time to a temperature of 70 degrees Fahrenheit or higher. When the temperature of the car body is at the desired point, the power for the fan may be cut off and a natural circulation of air will be caused by cool air entering and passing from the car body into chamber 12, conduit 11, and chamber 7 where it is heated, passed upward through conduit 15 and chamber 16 into the car body. It will be noted that the air passages or conduits are inclined to permit such natural circulation freely.

In this way the temperature of the car is rapidly raised, even though the temperature of the water in the engine jacket is relatively low. In addition, as the air is continuously withdrawn from the car body, heated and returned to the car body, the moisture content remains relatively low and as the temperature rises substantially no condensation of moisture will occur on the windshield.

It will be understood that the particular location of the heating jacket in the form of invention shown in Figure 1 and Figure 2 and other details of my invention may be varied widely by those skilled in the art without departing from the spirit of my invention.

Accordingly, what is desired to be secured by Letters Patent and claimed as new is:

1. In combination with an automobile, comprising a water jacketed internal combustion engine and passenger body compartment, a casing secured to the engine jacket, and forming an air heating chamber, an air conduit leading air from said body compartment to said air chamber, and an air conduit leading air from said air heating chamber to said body compartment.

2. The combination as set forth in claim 1 including means for inducing forced circulation of air between said body compartment, and said air heating compartment.

3. An automobile heating system for an automobile having a passenger carrying body and a water cooled internal combustion engine comprising a casing secured to said engine and enclosing a part of the exterior surface thereof independently of the engine exhaust, a conduit between said body and said casing, said conduit communicating with said body at a relatively low point therein and with said casing at a point not substantially lower and a second conduit between said casing and said body, said second conduit communicating with said casing at a point substantially above said first connection and with said body at a point substantially above said first named point.

4. An automobile heating system for the closed body of an automobile including a water jacketed engine arranged exteriorly of said body, comprising a closed casing surrounding a portion of said jacketed engine, an air supply conduit between the interior of said body and said casing, a return conduit between said casing and said body at a point substantially above said first named conduit, and means to positively cause a circulation of air from said body through said casing and back to said body.

5. An automobile heating system for the closed body of an automobile including a water jacketed engine arranged exteriorly of said body, comprising a closed casing surrounding a substantial portion of said jacketed engine, an air supply conduit between a low point in the interior of said body and a low point of said casing, a return conduit between a high point of said casing and said body communicating with the latter at a point substanitally above said first named conduit and means in said last named conduit to positively cause the air rising from said casing to flow into said body.

6. In an automobile having a passenger compartment, a water-jacketed engine, and a dash separating said compartment from said engine, the combination of an air heater adapted to be heated by the heat of water in said jacket, conduits extending between said dash and said heater and opening into said compartment, and air-circulating means in one of said conduits for producing a forced circulation of air from said compartment to said heater and back to said compartment.

7. In an automobile having a passenger compartment, a water-jacketed engine, and a dash separating said compartment from said engine, the combination of conduits communicating with said compartment through said dash at two spaced points, an air heating unit adapted to be heated by water in said jacket and connected to said conduits, and means at one end of one of said conduits for creating a forced circulation of air between said compartment and said heating unit.

In testimony whereof I affix my signature.
CHARLES B. WATERS.